Aug. 7, 1956     L. C. BIGGLE     2,757,683
PRESSURE REGULATOR
Filed March 27, 1953
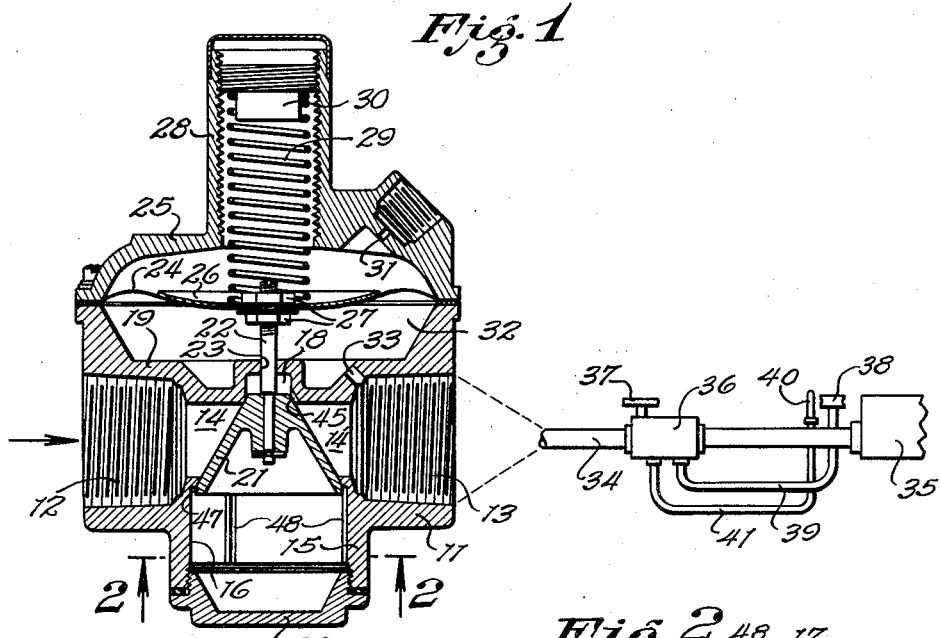
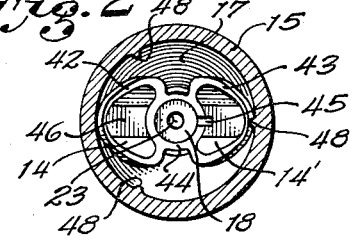
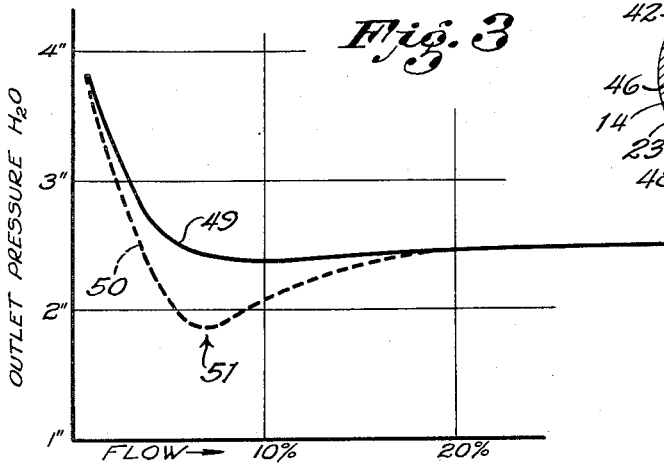
INVENTOR,
LAURENCE C. BIGGLE
BY
John H. Rouse,
ATTORNEY.

United States Patent Office 2,757,683
Patented Aug. 7, 1956

2,757,683

PRESSURE REGULATOR

Laurence C. Biggle, Altadena, Calif., assignor to General Controls Co., Glendale, Calif., a corporation of California Application March 27, 1953, Serial No. 345,020

5 Claims. (Cl. 137—505.36)

This invention relates to fluid pressure regulators, and more particularly to regulators of the type adapted for use in low-pressure fuel-gas systems.

A main object of this invention is to provide an improved regulator of the type which employs a regulating valve comprising a wedge-shaped or conical closure member mounted for endwise movement into and out of engagement with a pair of opposed valve seats.

Valves of this kind are simple to construct and generally effective, but usually do not operate satisfactorily in a gas regulator. I have found that one reason for such unsatisfactory operation is lateral movement or tilting of the closure member under the pressure of the gas at the inlet of the valve. In a well constructed valve the lateral movement may be slight but is still sufficient to cause engagement of the closure member with the outlet seat after the closure member has been moved axially through a few one-thousandths of an inch from its fully closed position, so that at that point the flow through the regulator is greatly reduced. Because of such a defect the regulator may fail to meet the performance requirements of the American Gas Association. Moreover, when a small pilot valve is supplied through the regulator to provide a continuously burning flame, the reduction of flow may cause extinguishment of that flame.

It is therefore an object of this invention to provide, in a valve of the kind described, means for overcoming the defect pointed out in connection therewith.

For full understanding of the invention, and further appreciation of its features and advantages, reference is to be had to the following detailed description and accompanying drawing, and to the appended claims.

In the drawing:

Figure 1 is a sectional view of a regulator embodying the invention, and a diagrammatic showing of a gas burner system supplied through the regulator;

Figure 2 is a view from below taken along the line 2—2 of Fig. 1 with the conical closure member 21 removed; and Figure 3 is a graph showing a typical flow curve of the regulator.

In the drawing the numeral 11 indicates a die-cast valve casing having inlet and outlet connections 12 and 13, respectively, which are interconnected by a through port whose inlet and outlet sections are indicated at 14 and 14'. Within the casing is a chamber comprising a cylindrical opening 16 in a boss 15 on the underside of the casing, and a conical opening 17 (Fig. 2) extending upwardly from opening 16 and intersecting the port so as to divide it into said sections. At its top the conical opening 17 is enlarged to provide a cup-shaped cavity 18 in a thickened portion of the top wall 19 of the casing. The lower end of the chamber comprising openings 16 and 17 is closed by a threaded cap 20. Cooperating with the conical opening 17 is a conical closure member 21 having a stem 22 which extends through an opening 23 in the end wall of cavity 18 to the exterior of the casing.

The dished top of the casing is covered by a flexible diaphragm 24 clamped at its margin between the top edge of the casing and the bottom edge of a dished cover member 25. The closure-member stem 22 extends through a central opening in the diaphragm, and in a stiffening plate 26 on top of the diaphragm, and is sealingly secured thereto by nuts 27. In a tubular projection 28 of cover member 25 is a spring 29 which is compressed between diaphragm-plate 26 and a plug 30 threadedly mounted above the spring for adjusting the force of the same. The space above the diaphragm is vented to atmosphere by a restricted opening 31 in the cover member. The pressure or work chamber 32 below the diaphragm communicates with the outlet of the regulator by way of an opening 33 in the top wall of the casing.

The regulator is shown connected by a conduit 34 to a main gas burner 35; a conventional valve structure 36 being interposed in the conduit for controlling the supply of gas. The valve structure may be of the type which includes a rotary plug (whose handle is indicated at 37), as well as safety means for obstructing flow to the main burner in the event of extinguishment of the flame of a pilot burner 38 normally supplied with gas by a tube 39; the safety means including a thermocouple 40 arranged for heating by the flame of the pilot burner and electrically connected to the valve structure through a tube 41. Typical examples of this kind of valve structure are disclosed in Ray Patents No. 2,447,207 and No. 2,472,384.

As can be seen in Fig. 2 (which is a view looking upwards with the closure member removed) the areas around the opposed ends of the port sections 14 and 14' facing the conical opening 17 are raised slightly from the conical surface to provide a pair of narrow valve seats 42 and 43 which are machined to define part of a conical opening conforming to the curvature of the conical closure member 21; the upper portions of these seats forming part of an annular tapered seat at the bottom or mouth of cavity 18 (see Fig. 1), this cavity being in continuous communication with the outlet port-section 14' by way of a restricted passage formed by a slot 45 cut in the annular seat 44. To increase the area of the portions of seat 44 adjoining port-seats 42–43, the top wall of the port is built-up to form a flat surface indicated at 46 in Fig. 2. The narrow cylindrical portion 47 of closure member 21 near its bottom (see Fig. 1) is guided by three narrow vertical ribs 48 projecting from the wall of opening 16.

The general operation of the regulator is quite conventional—the closure member 21 being moved in endwise directions by the pressure motor, which comprises diaphragm 24, to flow-regulating positions, determined by the pressure at the outlet of the regulator and in work chamber 32, so as to maintain the outlet pressure constantly at the desired value. In Fig. 1 the regulator is shown in operation with its parts in the positions assumed when manual valve 36 is closed.

In the graph of Fig. 3 the solid line 49 is a typical performance curve of a regulator substantially as shown in the drawing, the inlet pressure being about 7 inches water. The "flow" values indicate the percentage of maximum flow for which the particular regulator was designed and set, and correspond generally to the adjusted positions of valve handle 37.

The broken line 50 in the graph is the comparative curve of a regulator of generally the same construction as the one shown in the drawing but having a continuous conical seating surface for the closure member, and wherein there is no vent for cavity 18 equivalent to the slot or passage 45 shown in Figs. 1 and 2. As was pointed out in the statement of invention in reference to a regulator valve of the conical type, upon downward movement of the closure member through a few one-thousandths of an inch from its fully closed position the closure member, under the pressure of the gas at the inlet of the regulator, swings toward the outlet seat so that (in the absence of the improvements of this invention) the flow is then substantially reduced; this condition being indicated in the graph by the dip 51 in curve 50.

In the operation of the improved regulator shown in the drawing, when, in response to opening of manual valve 36, the closure member 21 is moved downwardly through a slight distance it swings toward the outlet seat 43, reducing or substantially obstructing flow through the outlet port-section 14'. However, due to the lateral movement of the closure member the clearance space between it and the inlet seat 42 then becomes larger, so that the gas passes more freely through that space into cavity 18, and thence through slot 45 to the outlet of the regulator. In this way there is no appreciable reduction of the flow, so that the outlet pressure curve is regular and substantially as shown at 49 in the graph.

In general, the passage (such as at 45), permitting restricted communication between the inlet and the outlet of the regulator when the outlet seat 43 is engaged by the closure member, could be arranged between the outlet and the part of the chamber at either end of the closure member; however, the arrangement substantially as shown is preferred, especially since the additional valve means formed by the annular seat 44 and the cooperating small end of the closure member contributes to regulation of the initial flow.

The clearance between the closure member and the conical surface 17, provided by the raised seats 42—43, facilitates flow to cavity 18 past the inlet side of the closure member in its initial opening movement. However, in its broader aspects the invention comprehends a continuous conical seating surface for the closure member.

The fit of closure-member stem 22 in its opening 23 is preferably quite free (for example, .002" clearance for .125" stem) so that leakage around the stem into work chamber 32 contributes to the regulating effect in initial opening of the closure member.

While a conical valve structure has been shown, and while that form of valve is preferred, it is apparent that similar results might be obtained if the valve structure were generally wedge-shaped. The illustrated embodiment of the invention is susceptible of still further modification without departing from the spirit of the invention, and I intend therefore to be limited only by the scope of the appended claims.

I claim as my invention:

1. In a fluid pressure regulator: a casing having an inlet and an outlet and a port therebetween, there being a chamber in the casing dividing said port into an inlet and an outlet section, said chamber having a conical wall portion transverse to the axis of the port and forming seating surfaces at the opposed ends of the port-sections; a tapered closure member in said chamber having surfaces engageable with said seating surfaces so as to obstruct flow through both of said port-sections, said closure member being movable endwise out of and into engagement with the seating surfaces to control flow through the port; means responsive to the pressure at the outlet of the regulator for operatively moving the closure member between closed and fully-open positions and for regulating the position of the closure member, intermediate said closed and fully-open positions, in accordance with variation of said outlet pressure; and means defining a restricted passage continuously interconnecting a part of the chamber and the outlet of the regulator.

2. In a fluid pressure regulator: a casing having an inlet and an outlet and a port therebetween, there being a chamber in the casing dividing said port into an inlet and an outlet section, said chamber having a continuous conical wall portion transverse to the axis of the port and encompassing the opposed ends of the port-sections; a conical closure member fitting the surface of said conical wall portion and movable endwise out of and into engagement therewith to control flow through the port; means responsive to the pressure at the outlet of the regulator for operatively moving the closure member between closed and fully-open positions and for regulating the position of the closure member, intermediate said closed and fully-open positions, in accordance with variation of said outlet pressure; and means defining a restricted passage continuously interconnecting a part of the chamber and the outlet of the regulator.

3. A fluid pressure regulator as defined in claim 2, and wherein said part of the chamber connected to the outlet of the regulator is the part beyond the smaller end of the closure member when the same is seated.

4. In a fluid pressure regulator: a casing having an inlet and an outlet and a port therebetween, as well as a chamber having a conical surface transverse to the axis of said port and dividing the port into an inlet and an outlet port-section; means raised from said conical surface around the opposed ends of said port-sections to provide a pair of narrow valve seats whose surfaces define part of a conical opening concentric with said conical surfaces; means joining the portions of said seats at the smaller end of said conical opening so as to form with the port-seats an annular seat; said chamber providing a cup-shaped cavity at the smaller end of the conical opening, the mouth of said cavity being formed by said annular seat; a conical closure member movable in directions along the axis of the conical opening, said closure member being engageable with said port-seats to obstruct flow through said port-sections, and with said annular seat to close said mouth of the cavity when the closure member is in engagement with the port-seats; said closure member having at its smaller end a stem extending freely through an opening in the end wall of the cup-shaped cavity to the exterior of the casing; means responsive to the pressure at the outlet of the regulator, and connected to said stem, for moving the closure member in said directions to control flow through the port and to establish communication between said cavity and said inlet port-section in initial opening movement of the closure member, said pressure responsive means being arranged to move the closure member between closed and fully-open positions and to regulate the position of the closure member, intermediate said closed and fully-open positions, in accordance with variation of said outlet pressure; and means defining a restricted passage continuously interconnecting said cavity and said outlet port-section.

5. A fluid pressure regulator as defined in claim 4, and wherein said pressure responsive means comprises a pressure motor mounted on the casing and having a work chamber into which said closure-member stem extends, so that there is restricted communication between the work chamber and said cavity because of the free fit of the stem in its opening.

References Cited in the file of this patent

UNITED STATES PATENTS

| Number | Name | Date |
|---|---|---|
| 321,426 | Ells | July 7, 1885 |
| 390,568 | Carter | Oct. 2, 1888 |
| 1,202,527 | Hynes | Oct. 24, 1916 |
| 2,237,776 | Benoit | Apr. 8, 1941 |
| 2,668,396 | Kern | Feb. 9, 1954 |